(12) United States Patent
Schlemmer et al.

(10) Patent No.: US 8,818,675 B2
(45) Date of Patent: Aug. 26, 2014

(54) METHOD AND DEVICE FOR ASCERTAINING THE SPEED OF A MOTOR VEHICLE

(75) Inventors: Martin Schlemmer, Mainhardt (DE); Rafael Seiler, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 232 days.

(21) Appl. No.: 13/378,907

(22) PCT Filed: Oct. 28, 2010

(86) PCT No.: PCT/EP2010/066340
§ 371 (c)(1),
(2), (4) Date: Mar. 1, 2012

(87) PCT Pub. No.: WO2011/054724
PCT Pub. Date: May 12, 2011

(65) Prior Publication Data
US 2012/0150407 A1    Jun. 14, 2012

(30) Foreign Application Priority Data
Nov. 6, 2009 (DE) .......................... 10 2009 046 448

(51) Int. Cl.
*B60W 40/10* (2012.01)
*G01P 3/50* (2006.01)

(52) U.S. Cl.
USPC ................................. 701/74; 701/70; 701/99

(58) Field of Classification Search
CPC .......... B60W 40/105; B60W 2720/10; B60W 2720/28; B60W 2720/30; G01P 3/00
USPC ........................................................... 701/71
See application file for complete search history.

(56) References Cited

U.S. PATENT DOCUMENTS

| 4,779,447 A | 10/1988 | Rath |
| 5,331,839 A * | 7/1994 | Schmidt .............................. 73/9 |
| 5,402,345 A * | 3/1995 | Kost ................................ 701/74 |
| 2007/0061061 A1 | 3/2007 | Salman |

FOREIGN PATENT DOCUMENTS

| CN | 1160851 | 10/1997 |
| DE | 35 34 022 | 3/1987 |
| DE | 40 10 212 | 10/1991 |
| DE | 40 24 815 | 2/1992 |

* cited by examiner

*Primary Examiner* — Helal A Algahaim
*Assistant Examiner* — Charles J Han
(74) *Attorney, Agent, or Firm* — Kenyon & Kenyon LLP

(57) ABSTRACT

A method for ascertaining the speed of a motor vehicle with the aid of wheel rotational speed sensors. To improve the calculation of the vehicle speeds on the basis of the wheel speeds, a first group of wheels of the motor vehicle is decelerated and a second group of wheels of the motor vehicle is simultaneously accelerated.

16 Claims, 1 Drawing Sheet

METHOD AND DEVICE FOR ASCERTAINING THE SPEED OF A MOTOR VEHICLE

BACKGROUND INFORMATION

In motor vehicles, the actual vehicle speed is calculated on the basis of the individual wheel speeds or wheel rotational speeds, among other things. However, it is possible to accurately calculate the vehicle speed only in a state in which at least one wheel rotates in the linear range of the mu slip curve, and the wheel speed may thus be transmitted linearly to the freely rolling wheel speed which corresponds to the vehicle speed.

In an all wheel drive vehicle, all wheels may be subject to slipping during an acceleration operation, which makes it considerably more difficult to calculate the vehicle speeds. In the presence of traction slip, an attempt is therefore made to brake the wheels with the aid of diagonal brake interventions in such a way that the freely rolling speeds of the wheels may be calculated to thereby infer the vehicle speed. However, the total driving torque is reduced by braking the wheels. This is noticeable to the driver as deceleration, which is frequently not desirable.

An object of the present invention is therefore to improve the known methods for determining the vehicle speed, and a deceleration of the motor vehicles is to be minimized, in particular.

SUMMARY OF THE INVENTION

In the method according to the present invention, a first group of wheels is decelerated and a second group of wheels is accelerated. A group may include one or more wheels. In the event of traction slip, the first group is preferably decelerated to the reference speed of freely rotating wheels, and the second group is preferably accelerated by approximately the same amount, e.g., the intervention is largely driving torque-neutral. This makes it possible, on the one hand, to accurately determine the vehicle speed, while on the other hand, the driving torque acting upon the vehicle remains largely constant.

According to a special specific embodiment of the present invention, the first group of wheels is accelerated and the second group of wheels is simultaneously decelerated in an additional method step. The opposite intervention is thus applied to the wheel groups. The two method steps may be alternately repeated.

In principle, wheels may be decelerated either by applying the brakes or by reducing the driving torque. In a vehicle which has an electric motor, it is possible, for example, to quickly reduce the driving torque by turning off the electric current. Free rolling of the associated wheel may be induced by specifying a setpoint torque of 0 Nm, for example, for an electric motor.

When decelerating or accelerating individual wheels, the inertia of the drive configuration of the motor vehicle is preferably taken into account. The mass inertia of the drivetrain is decisive for the dynamics of the deceleration or acceleration of a wheel.

The deceleration and simultaneous acceleration preferably last for only a short period of time, preferably between 10 ms and 1 second. This time period is sufficient for determining the vehicle speed, yet it only slightly influences the performance of the vehicle.

In a vehicle which has four wheels, the wheels of the first group are preferably assigned to a first vehicle diagonal. The wheels of the second group are assigned to the second vehicle diagonal. Each group includes two wheels in this case. Alternatively, the wheels of the first group may also be assigned to a first axle and the wheels of the second group may be assigned to a second axle. In each case, the intervention into the wheels is yawing moment-neutral, i.e., the motor vehicle does not experience any torque around its vertical axis.

An algorithm for carrying out the method according to the present invention is preferably stored in a control unit. When the vehicle speed needs to be determined, the control unit activates the vehicle drives and/or the wheel brakes, as described above.

The present invention may be used, in particular, in vehicles which have two or more drives, for example vehicles which have a first drive assigned to a first axle and a second drive assigned to a second axle, or in vehicles which have wheel-specific drives.

DETAILED DESCRIPTION

Figure 1A:
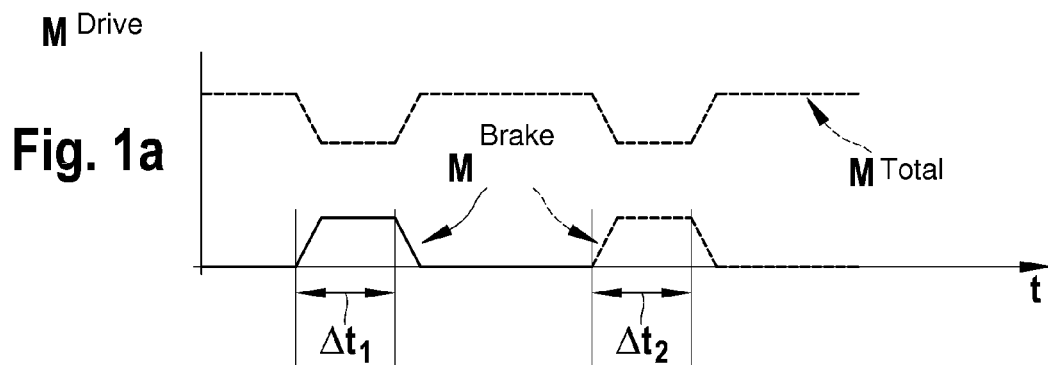
FIG. 1a shows the curve of the driving torque during deceleration of wheels according to a conventional method.

FIG. 1a shows the temporary deceleration of multiple wheels according to a method known from the related art. The braking torque applied to the wheels is identified by $M_{brake}$ and the total driving torque of the vehicle is identified by $M_{total}$. The wheels of the first vehicle diagonal are braked during a first time interval $\Delta t_1$.

As a result thereof, total driving torque $M_{total}$ is reduced by a corresponding amount. The wheels of the second vehicle diagonal are then braked during a second time interval $\Delta t_2$. Total driving torque $M_{total}$ is, in turn, reduced accordingly. First time interval $\Delta t_1$ and second time interval $\Delta t_2$ are each approximately 20 seconds.

Figure 1B:
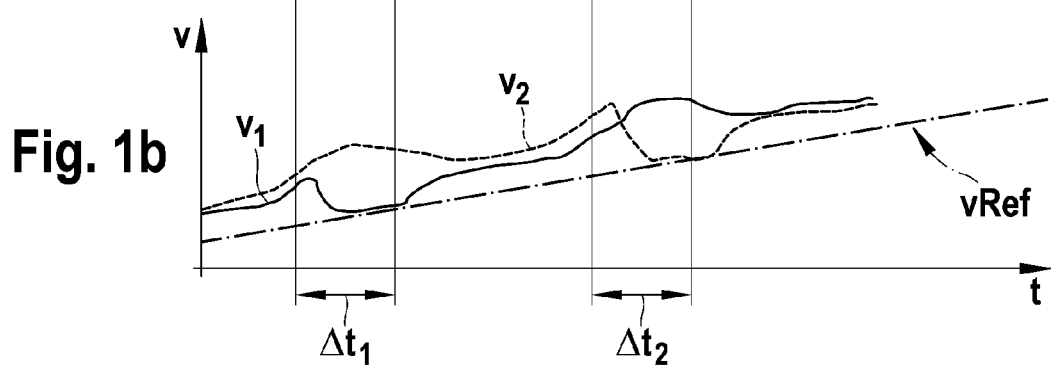
FIG. 1b shows the curve of the associated wheel speeds.

FIG. 1b shows the associated speeds v of the individual wheels. As is apparent, speed $v_1$ of the wheels of the first diagonal decreases during first time interval $\Delta t_1$ to a reference speed $v_{ref}$ at which the wheels roll within the linear range of the mu slip curve. Speed $v_2$ of the wheels of the second vehicle diagonal remains nearly constant during first time interval $\Delta t_1$. The opposite is true for second time interval $\Delta t_2$.

Figure 2A:
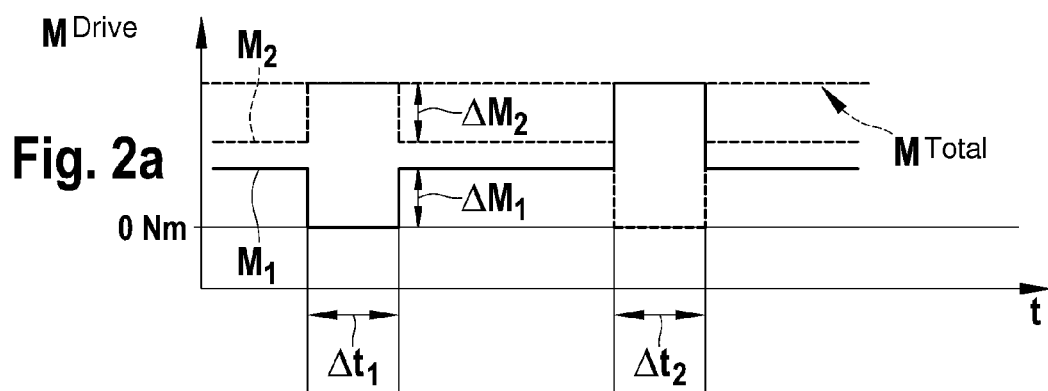
FIG. 2a shows the curve of different driving torques during deceleration and acceleration of individual wheels according to a method according to the present invention.
Figure 2B:
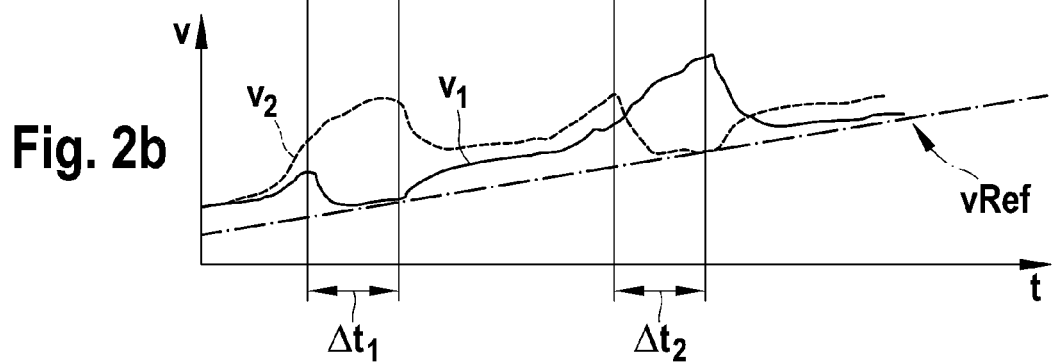
FIG. 2b shows the curve of the associated wheel speeds.

FIGS. 2a and 2b show the time curve for driving torques $M_{drive}$ and associated wheel speeds v when the method according to the present invention is used.

During first time interval $\Delta t_1$, the wheels of the first vehicle diagonal of the motor vehicle are braked by reducing a driving torque $M_1$ by $\Delta M_1$. At the same time, the wheels of the second vehicle diagonal are accelerated and their driving torque $M_2$ is increased by $\Delta M_2$. Total driving torque $M_{total} = M_1 + M_2$ remains at a constant value. During first time interval $\Delta t_1$, the following applies to $\Delta M_1 = \Delta M_2$: $M_{total} = (M_1 - \Delta M_1) + (M_2 + \Delta M_2) = M_1 + M_2$.

During second time interval $\Delta t_2$, the wheels of the first group are then accelerated by $\Delta M_1$ and the wheels of the second group are decelerated by $\Delta M_2$, total driving torque $M_{total}$ also remaining constant. During second time interval $\Delta t_2$, the following applies to $\Delta M_1 = \Delta M_2$: $M_{total} = (M_1 + \Delta M_1) + (M_2 - \Delta M_2) = M_1 + M_2$. The acceleration and deceleration of the individual wheel groups are repeated periodically.

FIG. 2b shows corresponding speeds v of the wheels of the individual groups. During first time interval $\Delta t_1$, speed $v_1$ of the wheels of the first group is reduced to reference speed $v_{ref}$. Speed $v_2$ of the wheels of the second group increases according to torque $\Delta M_2$. During second time interval $\Delta t_2$, on the other hand, speed $v_1$ of the wheels of the first group increases and speed $v_2$ of the wheels of the second group decreases to reference speed $v_{ref}$.

The speed of the motor vehicle increases at a constant gradient over the entire period when the method described in FIGS. 2a and 2b is carried out.

What is claimed is:

1. A method for ascertaining a speed of a motor vehicle with the aid of wheel rotational speed sensors, comprising:
    determining a reference speed of freely rotating wheels;
    decelerating a first group of wheels of the motor vehicle to the reference speed of the freely rotating wheels; and
    simultaneously accelerating a second group of wheels of the motor vehicle;
    accelerating the first group of wheels and simultaneously decelerating the second group of wheels in an additional method step;
    repeatedly alternating between method steps of:
    decelerating the first group of wheels and accelerating the second group of wheels, and
    accelerating the first group of wheels and decelerating the second group of wheels; and
    ascertaining the speed of the motor vehicle based on the repeatedly alternating step.

2. The method according to claim 1, further comprising accelerating the first group of wheels and simultaneously decelerating the second group of wheels in an additional method step.

3. The method according to claim 2, further comprising repeatedly alternating between method steps of:
    decelerating the first group of wheels and accelerating the second group of wheels; and
    accelerating the first group of wheels and decelerating the second group of wheels.

4. The method according to claim 1, wherein the wheels are decelerated and accelerated in such a way that a total driving torque of the motor vehicle remains largely constant.

5. The method according to claim 4, wherein the deceleration predefined at the wheels of the one group is substantially the same as an acceleration of the other group.

6. The method according to claim 1, wherein the deceleration of the particular wheels is carried out by a brake intervention.

7. The method according to claim 1, wherein the deceleration of the particular wheels is carried out by reducing a driving torque.

8. The method according to claim 7, wherein an inertia of a drive configuration of the motor vehicle is taken into account in the deceleration and acceleration of the individual wheels.

9. The method according to claim 1, wherein the decelerating of the first group of wheels occurs upon a detection of a slipping event.

10. The method according to claim 1, wherein the decelerating and simultaneous accelerating are carried out for a predetermined length of time, wherein the predetermined length of time is sufficient to determine the speed of the motor vehicle and minimize an influence on a performance of the motor vehicle due to the decelerating and simultaneous accelerating on the first and second groups of wheels.

11. The method according to claim 10, wherein the deceleration and the simultaneous acceleration are carried out for a period of time between 10 ms and 1 second.

12. The method according to claim 1, wherein the decelerating and simultaneous accelerating are yawing moment-neutral.

13. The method according to claim 12, wherein the wheels of the first group are assigned to a first vehicle diagonal and the wheels of the second group are assigned to a second vehicle diagonal.

14. The method according to claim 12, wherein the wheels of the first group are assigned to a first axle of the motor vehicle and the wheels of the second group are assigned to a second axle of the motor vehicle.

15. The method according to claim 1, wherein a first drive is assigned to the first group of wheels and a second drive is assigned to the second group of wheels.

16. A control unit for ascertaining a speed of a motor vehicle with the aid of wheel rotational speed sensors, comprising:
    means for determining a reference speed of freely rotating wheels;
    means for decelerating a first group of wheels of the motor vehicle to the reference speed of the freely rotating wheels; and
    means for simultaneously accelerating a second group of wheels of the motor vehicle;
    means for accelerating the first group of wheels and simultaneously decelerating the second group of wheels in an additional method step;
    means for repeatedly alternating between actuating:
    means for decelerating the first group of wheels and accelerating the second group of wheels, and
    means for accelerating the first group of wheels and decelerating the second group of wheels; and
    means for ascertaining the speed of the vehicle based on the means for repeatedly alternating.

* * * * *